(12) United States Patent
Heithoff et al.

(10) Patent No.: US 11,334,537 B1
(45) Date of Patent: May 17, 2022

(54) DATABASE METADATA TRANSFER SYSTEM AND METHODS THEREOF

(71) Applicant: West Corporation, Omaha, NE (US)

(72) Inventors: Steven Heithoff, Elkhorn, NE (US); Lakshmi Borra, Omaha, NE (US); Mayank Sawala, Omaha, NE (US)

(73) Assignee: INTRADO CORPORATION, Omaha, NE (US)

( * ) Notice: Subject to any disclaimer, the term of this patent is extended or adjusted under 35 U.S.C. 154(b) by 161 days.

(21) Appl. No.: 16/375,316

(22) Filed: Apr. 4, 2019

(51) Int. Cl.
*G06F 17/00* (2019.01)
*G06F 16/21* (2019.01)

(52) U.S. Cl.
CPC ................... *G06F 16/214* (2019.01)

(58) Field of Classification Search
None
See application file for complete search history.

(56) References Cited

U.S. PATENT DOCUMENTS

| | | | | |
|---|---|---|---|---|
| 8,140,558 B2* | 3/2012 | Kiefer | ..................... | G06F 16/86 707/760 |
| 2001/0037345 A1* | 11/2001 | Kiernan | .................. | G06F 16/86 |
| 2002/0112224 A1* | 8/2002 | Cox | ........................ | G06F 16/86 717/100 |
| 2002/0175943 A1* | 11/2002 | Hunt | ....................... | H04M 3/51 715/771 |
| 2004/0006745 A1* | 1/2004 | van Helden | ............ | G06F 9/451 715/210 |
| 2006/0167760 A1* | 7/2006 | Chakraborty | .......... | G06Q 30/02 705/26.61 |
| 2007/0011192 A1* | 1/2007 | Barton | ..................... | G06F 16/83 |
| 2008/0104143 A1* | 5/2008 | Khor | .................. | G01R 31/2834 |
| 2008/0208851 A1* | 8/2008 | Briggs | ................... | H04H 20/14 |
| 2013/0110764 A1* | 5/2013 | Wilf | ....................... | G06F 16/283 707/600 |
| 2013/0110770 A1* | 5/2013 | Stevelinck | ............. | G06Q 50/24 707/609 |
| 2013/0198605 A1* | 8/2013 | Nicola | .................. | G06F 16/116 715/234 |
| 2013/0204886 A1* | 8/2013 | Faith | ................... | G06F 16/2379 707/756 |
| 2014/0351256 A1* | 11/2014 | Gluck | ............... | H04M 3/42221 707/740 |
| 2020/0042724 A1* | 2/2020 | Bastianelli | ............ | G06F 16/176 |

* cited by examiner

*Primary Examiner* — Hasanul Mobin (57) ABSTRACT

Disclosed herein are database metadata transfer systems and methods thereof. The database metadata transfer methods may include receiving a command to transfer preproduction metadata to production metadata; reading preproduction database metadata; generating a data file for making the change, the data file comprising SQL commands or insert statements; and executing a transfer from preproduction metadata to production metadata based on the SQL commands or insert statements. In some embodiments, the database may be a call center database and the data file may an Extensible Markup Language (XML) file.

12 Claims, 4 Drawing Sheets

DATABASE METADATA TRANSFER SYSTEM AND METHODS THEREOF

BACKGROUND

Field of the Invention

This application relates to a database metadata transfer system and methods thereof. More particularly, embodiments of the present disclosure are related to a system and method for transforming an output produced by a database scanner and creating instructions to transfer database metadata to a new database.

Description of the Related Art

In software deployment, methods often include testing new code in a development environment system ("pre-production" or "preprod") that runs the same code that the end users will use ("production" or "prod") but with new code pushed to the preprod environment first. Code changes are first pushed to pre-production, validation tests are executed, and when they pass the code changes are pushed to production. By testing and analyzing the output of the pre-production system, the impact of the code change on the production system can be determined. There may also be several stages in between preprod and prod. This structured release management process allows phased deployment (rollout), testing, and rollback in case of problems.

A problem exists because often preprod data and prod data do not match. Solutions for fixing this problem have included having the developers fill out manual forms to alert others charged with fixing the problem or having additional developers or users fix the problem. The problem with these solutions is they take a significant amount of time and effort to complete, and these manual processes increase the risk of human error. A need exists for an improved system of correcting the problem of mismatched preprod and prod data in a quick and automatic way.

SUMMARY

Example embodiments of the present application provide at least a database metadata transfer system and methods thereof. According to an exemplary embodiment of the present invention, there is provided a method comprising receiving a command to transfer preproduction metadata to production metadata; reading preproduction database metadata; generating a data file for making the change, the data file comprising SQL commands (upinserts) and/or insert statements; and executing a transfer from preproduction metadata to production metadata based on the SQL commands and/or insert statements. In some embodiments, the database may be a call center database and the data file may an Extensible Markup Language (XML) file.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

This application relates to a database metadata transfer system and methods thereof. More particularly, embodiments of the present disclosure are related to a system and method for transforming an output produced by a database scanner and creating instructions to transfer database metadata to a new database.

Embodiments of the present disclosure are related to databases and database driven systems. By way of example, systems and methods disclosed herein may include any database used in managing and making calls or call center databases. One such example may include a relational database and a relational database management system (RDBMS). In some embodiments, horizontal scaling of computer clusters, NoSQL databases, or the like, may be used.

Embodiments of the present disclosure relate to making changes or moving metadata from preproduction to production. In accordance with embodiments of the present disclosure, when a command is initiated to move from preprod to prod, the systems read the data that is saved. The system may then create a data file, such as an XML (Extensible Markup Language) data file where commands for making the change from preprod to prod can be executed in full. The system may generate SQL commands (upinserts) and/or insert statements in the XML file that will effectively make the change from preprod to prod such that the metadata is consistent from preprod to prod. The use of micro language may be employed to assist in making the transfer from preprod to prod wherein the metadata is consistent. In exemplary embodiments, the XML created by the system may include commands that allow quick development of a list of data that needs to be transferred and/or installed into a new database.

In accordance with embodiments of the present disclosure, instead of creating a series of commands, the system may create an XML file, or the like, with commands that allow the system or a user to quickly develop a list of things that need to be transferred or installed into a new database.

It will be readily understood that the components of the present application, as generally described and illustrated in the figures herein, may be arranged and designed in a wide variety of different configurations. Thus, the following detailed description of the embodiments as represented in the attached figures, is not intended to limit the scope of the application as claimed but is merely representative of selected embodiments of the application. Advantages and features of the present disclosure and technologies accomplishing them will become apparent from exemplary embodiments described in detail below with reference to the accompanying drawings.

The features, structures, or characteristics of the application described throughout this specification may be combined in any suitable manner in one or more embodiments. For example, the usage of the phrases "example embodiments", "some embodiments", "exemplary embodiments," or other similar language, throughout this specification refers to the fact that a particular feature, structure, or characteristic described in connection with the embodiment may be included in at least one embodiment of the present application. Thus, appearances of these phrases throughout this specification do not necessarily all refer to the same group of embodiments, and the described features, structures, or characteristics may be combined in any suitable manner in one or more embodiments.

For the purpose of simplification and clarity of illustration, a general configuration scheme will be illustrated in the accompanying drawings, and a detailed description for the feature and the technology well-known in the art will be omitted in order to prevent the discussion from being unnecessarily obscure. Additionally, components in the accompanying drawings are not necessarily drawn to scale. For example, sizes of some of the components illustrated in the accompanying drawings may be exaggerated as compared with other components in order to assist in the understanding of exemplary embodiments of the present invention. Like reference numerals on different drawings will denote like components, and similar reference numerals on different drawings will denote similar components but are not necessarily limited thereto.

Figure 1:
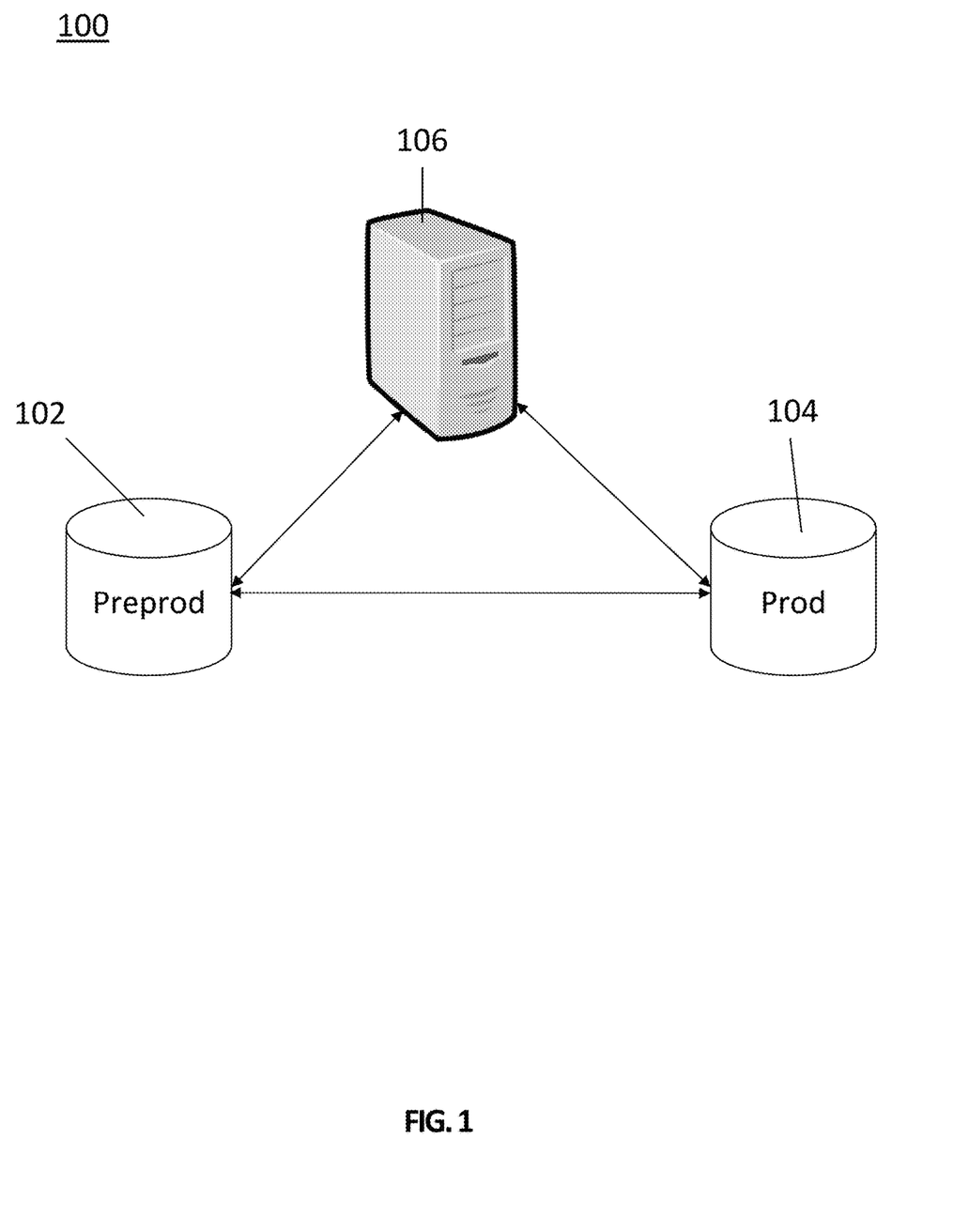
FIG. 1 is a system-level diagram of a portion of a database metadata transfer system according to an illustrative embodiment.

FIG. 1 is a system-level diagram of a portion of a database metadata transfer system 100 according to an illustrative embodiment. In some embodiments, the system 100 may include a preproduction or "preprod" database 102, a production or "prod" database 104 and a computing device 106, such as a server, or the like. The system 100 may receive an instruction at a computing device 106 to transfer preproduction metadata to production metadata from the preprod database 102 to the prod database 104. In accordance with exemplary embodiments, the computing device 106 may be adapted to read preproduction database metadata from the preprod database 102, or the like. The computing device 106 may be adapted to generate a data file for making the change, the data file comprising SQL commands (upinserts) and/or insert statements. The computing device 106 may be adapted to execute a transfer from preproduction metadata stored in the preprod 102 database to production metadata stored in the production database 104 based on the SQL commands (upinserts) and/or insert statements.

In some embodiments, the database may be a call center database. In some embodiments, the data file may be an Extensible Markup Language (XML) file. In some embodiments, the SQL commands (upinserts) and/or insert statements are completed using micro language. In some embodiments, the data file comprises a list of commands generated by the system that allow development of a list of data that needs to be transferred from a preprod database 102 to a prod database 104. In accordance with embodiments of the present disclosure, the system may create an XML file, or the like, with commands that allow the system or a user to quickly develop a list of things that need to be transferred or installed into a new database.

Figure 2:
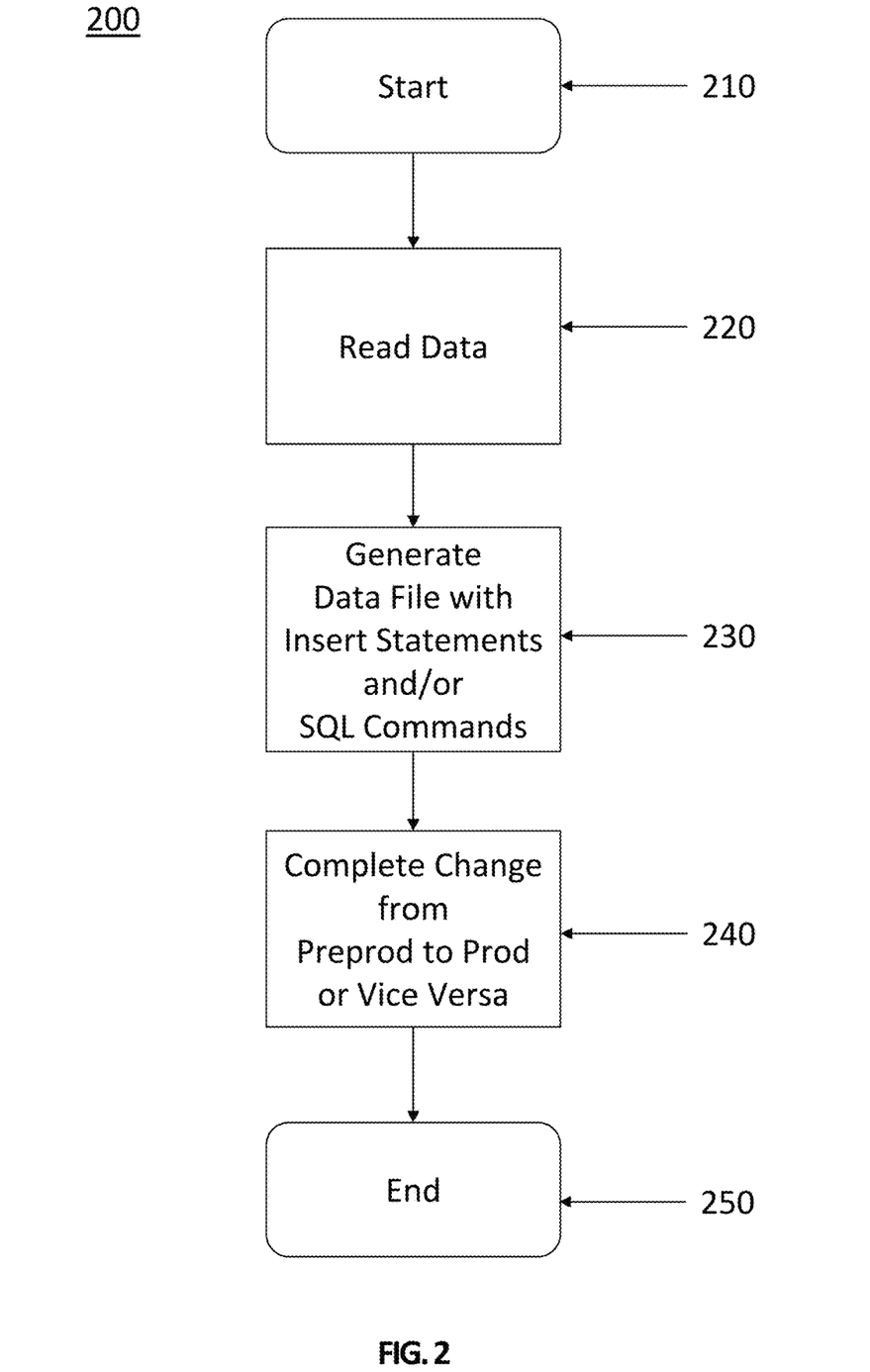
FIG. 2 is a flow chart illustrating a portion of a database metadata transfer system according to an illustrative embodiment.

FIG. 2 is a flow chart illustrating a portion of a database metadata transfer system 200 according to an illustrative embodiment. In some embodiments, the method begins at step 200 when a command to transfer preproduction metadata to production metadata is generated and/or received. In some embodiments, the databases may include call center databases. At step 220 a computing device may read the preproduction database metadata. At step 230 the system may generate a data file for making the change, the data file comprising SQL commands (upinserts) and/or insert statements. In some embodiments, the data file may be an Extensible Markup Language (XML) file. In some embodiments, the SQL commands (upinserts) and/or insert statements are completed using micro language. In some embodiments, the data file comprises a list of commands generated by the system that allow development of a list of data that needs to be transferred from a preprod database to a prod database. At step 240 the method may be completed by executing a transfer from preproduction metadata to production metadata based on the SQL commands (upinserts) and/or insert statements. After step 240, the method ends at step 250.

Referring back to FIG. 1, databases 102, 104 include representative databases. In the exemplary embodiment, databases 102, 104 may include a multitude of databases including call data, or the like. In alternative embodiments, the databases 102, 104 may include different types of data or combinations of data suitable for the system 100. Databases, which take the exemplary form of one or more electronic, magnetic, or optical data-storage devices, include or are otherwise associated with respective indices and respective database profiles. Each of the indices includes terms and phrases in association with corresponding document addresses, identifiers, and other conventional information. In some embodiments, each of the indices may also include consonant clusters and/or Porter-type word stems, or the like.

In exemplary embodiments, two types of database profiles may be included: one based on metadata, such as the titles and other data about the content of its corresponding database or corresponding set of databases, and the other based on actual database contents, such as query-based data samples and/or language models. Metadata-based database profiles may be defined using a markup language, such as XML. Some of the metadata-based profiles are organized around categories.

In exemplary embodiments, databases 102, 104 may be coupled or couplable via a wireless or wireline communications network, such as a local-, wide-, private-, or virtual-private network, to a computing device 106, such as a server, or the like. A computing device 106, which is generally representative of one or more servers for serving data in the form of markup language forms with associated software and data structures to service clients. More particularly, computing device 106 may include a processor, a memory, a subscriber database, one or more search engines, a profile database, a database directory, and a search-assistant software module (one or more cross-platform interface objects or modules). A processor may generally representative of one or more local or distributed processors or virtual machines, is coupled to memory. Memory, which takes the exemplary form of one or more electronic, magnetic, or optical data-storage devices, may store call databases, search engines, profile databases, database directories, and search-assistance software, or the like.

A subscription database may include user or call related data for controlling, administering, and managing call services. Search engines may provide Boolean or natural language search capabilities for databases and database directories. A profile database may contain profiles from databases. A database directory may include a hierarchically organized listing of the databases and an associated index, which may include terms, stemmed terms, and phrases or concepts, or the like.

Search-assistance software may define one or portions of a graphical user interface that helps users define searches for databases and may include one or more browser-compatible applets, webpage templates, user-interface elements, objects or control features or other programmatic objects or structures. More specifically, search assistance software may include a database-discovery module, a database-navigation module, and a database-selection module. Each module, in the exemplary embodiment, includes a set of one or more browser-compatible user-interface elements and associated software structures for assisting users in targeting relevant databases from databases.

A computing device 106 may be communicatively coupled or couplable via a wireless or wireline communications network, such as a local-, wide-, private-, or virtual-private network, to one or more access devices, databases, or the like. Access devices may not only be communicatively coupled or couplable to a computing device 106, but also generally representative of one or more access devices. In the exemplary embodiment, an access device takes the form of a personal computer, workstation, personal digital assistant, mobile telephone, or any other device capable of providing an effective user interface with a server or database.

Specifically, access devices may include one or more processors (or processing circuits), a memory, a display, a keyboard, and a graphical pointer or selector. Memory may include a graphical user interface (GUI) which upon execution causes display of data in association with one or more interactive control features (or user-interface elements) on display. More specifically, a graphical user interface may define or provide one or more display regions, respectively defined in memory to display data from databases 102, 104 and/or computing device 106 in combination with interactive control features. In exemplary embodiments, these control features may take the form of a hyperlink or other browser-compatible command input, and provide access to a search-assistance option for identifying one or more relevant target databases among databases and ultimately accessing or retrieving one or more documents via computing device 106.

The system may comprise one or more user devices, each in communication with an administrator, generally hosting a central server, through a network. Methods in accordance with one or more embodiments of the present invention take place over a network, which may comprise a global or local computer network, for example, the Internet or a LAN. In certain embodiments, multiple users may perform the same or similar functions. As understood by embodiments of the present invention, a user may include any person, business, or entity capable of participating in the system and methods disclosed herein. A user device communicatively coupled with the systems described herein may include, for example, a mobile communications device, a personal computer, a portable computer, a handheld computer, a kiosk station, a terminal station, a cellular phone, a smartphone, a digital tablet, a laptop computer, an Internet appliance, or the like.

The system may also comprise secondary servers. It should be appreciated that any number of servers feasible in accordance with embodiments of the present disclosure may be used. In certain embodiments, multiple servers may perform the same or similar functions. The server may also comprise a database or other sortable data storage memory to enable the system and methods disclosed herein. In many embodiments, the database may be any commercially available data storage database suitable for embodiments of the present disclosure. For example, in one embodiment, the database comprises at least one or more database management systems, such as any of an IBM, Oracle, DB2, Microsoft Access, Microsoft SQL Server, Postgres, MySQL, 4th Dimension, FileMaker, Alpha Five Database Management System, or the like. Often contained within the database is a plurality of data sets, each comprising specific data. A database may also include any number of subsequent data sets.

Figure 3:
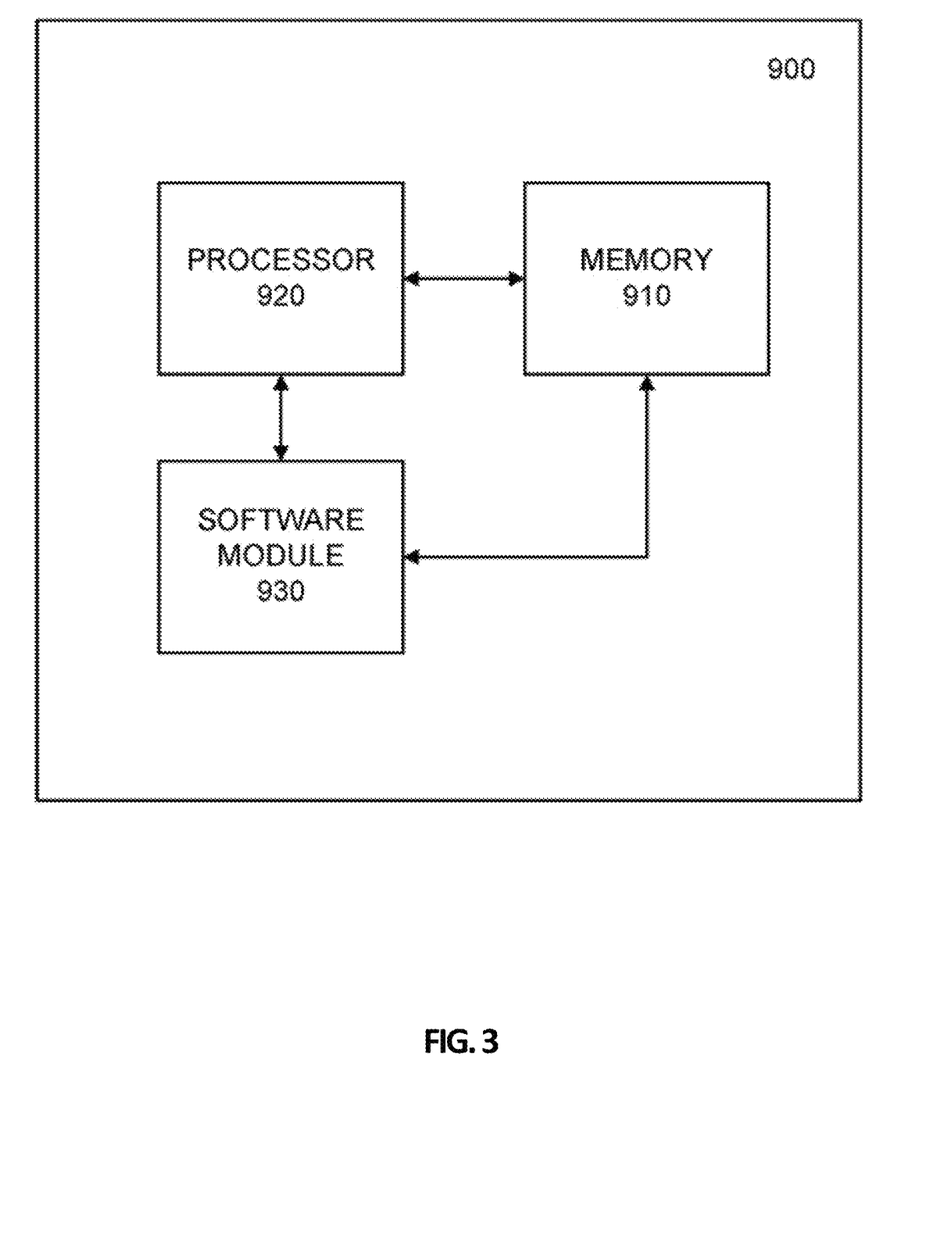
FIG. 3 illustrates an example network device configured to store instructions, software, and corresponding hardware for executing the same, according to example embodiments of the present application.

FIG. 3 illustrates an example network element 900, which may represent any of the above-described network components of the other figures. As illustrated in FIG. 3, a memory 910 and a processor 920 may be discrete components of the network entity 900 that are used to execute an application or set of operations. The application may be coded in software in a computer language understood by the processor 920, and stored in a computer readable medium, such as, the memory 910. The computer readable medium may be a non-transitory computer readable medium that includes tangible hardware components in addition to software stored in memory. Furthermore, a software module 930 may be another discrete entity that is part of the network entity 900, and which contains software instructions that may be executed by the processor 920. In addition to the above noted components of the network entity 900, the network entity 900 may also have a transmitter and receiver pair configured to receive and transmit communication signals.

Additional example embodiments provide multimode configuration options for customers using user devices (i.e., user devices, mobile devices, smartphones, other computing devices, etc.), to access multi-mode and/or multi-platform service platforms. For example, a visual and/or customized voice platform may provide interactive voice response menu options and other modes of operation (e.g., SMS, email, third-party device options, chat, etc.) to process user interaction data for purposes of offering services which may enable concluding a call or other active communication session.

Figure 4:
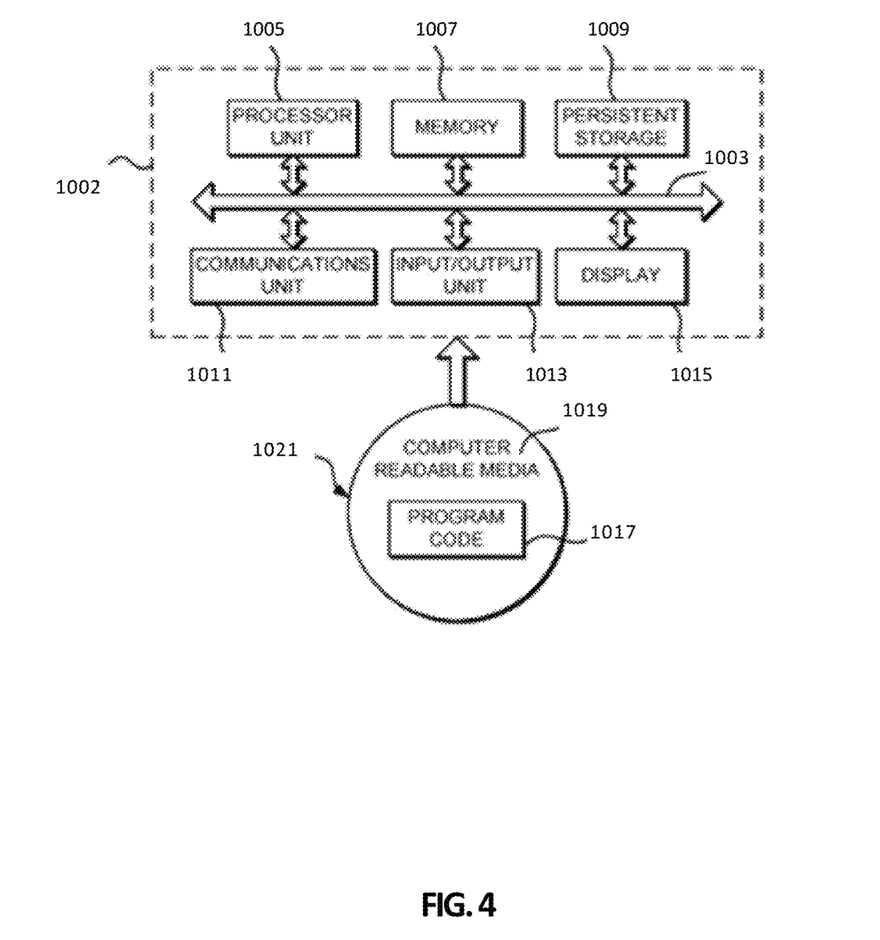
FIG. 4 is a block diagram of a computing device in which illustrative embodiments may be implemented.

Referring to FIG. 4, a block diagram of a computing device 1002 is shown in which illustrative embodiments may be implemented. The computing device 1002 may be the computing device on which the database metadata transfer systems depicted and described above is implemented. Computer-usable program code or instructions implementing the processes used in the illustrative embodiments may be located on the computing device 1002. The computing device 1002 includes a communications fabric 1003, which provides communications between a processor unit 1005, a memory 1007, a persistent storage 1009, a communications unit 1011, an input/output (I/O) unit 1013, and a display 1015.

The processor unit 1005 serves to execute instructions for software that may be loaded into the memory 1007. The processor unit 1005 may be a set of one or more processors or may be a multi-processor core, depending on the particular implementation. Further, the processor unit 1005 may be implemented using one or more heterogeneous processor systems in which a main processor is present with secondary processors on a single chip. As another illustrative example, the processor unit 1005 may be a symmetric multi-processor system containing multiple processors of the same type.

The memory 1007, in these examples, may be, for example, a random access memory or any other suitable volatile or non-volatile storage device. The persistent storage 1009 may take various forms depending on the particular implementation. For example, the persistent storage 1009 may contain one or more components or devices. For example, the persistent storage 1009 may be a hard drive, a flash memory, a rewritable optical disk, a rewritable magnetic tape, or some combination of the above. The media used by the persistent storage 1009 also may be removable. For example, a removable hard drive may be used for the persistent storage 1009.

The communications unit 1011, in these examples, provides for communications with other data processing systems or communication devices. In these examples, the communications unit 1011 may be a network interface card. The communications unit 1011 may provide communications through the use of either or both physical and wireless communication links.

The input/output unit 1013 allows for the input and output of data with other devices that may be connected to the computing device 1002. For example, the input/output unit 1013 may provide a connection for user input through a keyboard and mouse. Further, the input/output unit 1013 may send output to a processing device. In the case in which the computing device 1002 is a cellular phone, the input/output unit 1013 may also allow devices to be connected to the cellular phone, such as microphones, headsets, and controllers. The display 1015 provides a mechanism to display information to a user, such as a graphical user interface. The display 1015 may be used to display the text messages described in the illustrative embodiments.

Instructions for the operating system and applications or programs are located on the persistent storage 1009. These instructions may be loaded into the memory 1007 for execution by the processor unit 1005. The processes of the different embodiments may be performed by the processor unit 1005 using computer-implemented instructions, which may be located in a memory, such as the memory 1007. These instructions are referred to as program code, computer-usable program code, or computer-readable program code that may be read and executed by a processor in the processor unit 1005. The program code in the different embodiments may be embodied on different physical or tangible computer-readable media, such as the memory 1007 or the persistent storage 1009.

Program code 1017 is located in a functional form on a computer-readable media 1019 and may be loaded onto or transferred to the computing device 1002 for execution by the processor unit 1005. The program code 1017 and the computer-readable media 1019 form computer program product 1021 in these examples. In one embodiment, the computer program product 1021 is the database metadata transfer application described in the above figures. In this embodiment, the program code 1017 may include computer-usable program code capable of locating a mobile communication device associated with a user to form location data, accessing a location database to determine a geographic location of the mobile communication device based on the location data, and identifying an aggressor in a crisis situation.

In another embodiment, the program code 1017 may include computer-usable program code capable of receiving an image captured by a camera of a mobile communication device. The mobile communication device is associated with a user, and the image at least partially contains an object. Any combination of the above-mentioned computer-usable program code may be implemented in the program code 1017, and any functions of the illustrative embodiments may be implemented in the program code 1017.

In one example, the computer-readable media 1019 may be in a tangible form, such as, for example, an optical or magnetic disc that is inserted or placed into a drive or other device that is part of the persistent storage 1009 for transfer onto a storage device, such as a hard drive that is part of the persistent storage 1009. In a tangible form, the computer-readable media 1019 also may take the form of a persistent storage, such as a hard drive or a flash memory that is connected to the computing device 1002. The tangible form of the computer-readable media 1019 is also referred to as computer recordable storage media.

Alternatively, the program code 1017 may be transferred to the computing device 1002 from the computer-readable media 1019 through a communication link to the communications unit 1011 or through a connection to the input/output unit 1013. The communication link or the connection may be physical or wireless in the illustrative examples. The computer-readable media 1019 also may take the form of non-tangible media, such as communication links or wireless transmissions containing the program code 1017.

The different components illustrated for the computing device 1002 are not meant to provide architectural limitations to the manner in which different embodiments may be implemented. The different illustrative embodiments may be implemented in a data processing system including components in addition to or in place of those illustrated for computing device 1002. Other components shown in FIG. 10 can be varied from the illustrative examples shown.

As one example, a storage device in the computing device 1002 is any hardware apparatus that may store data. The memory 1007, the persistent storage 1009, and the computer-readable media 1019 are examples of storage devices in a tangible form. In another example, a bus system may be used to implement the communications fabric 1003 and may be comprised of one or more buses, such as a system bus or an input/output bus. Of course, the bus system may be implemented using any suitable type of architecture that provides for a transfer of data between different components or devices attached to the bus system. Additionally, the communications unit 1011 may include one or more devices used to transmit and receive data, such as a modem or a network adapter. Further, a memory may be, for example, the memory 1007 or a cache such as found in an interface and memory controller hub that may be present in the communications fabric 1003.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The previous detailed description is of a small number of embodiments for implementing the invention and is not intended to be limiting in scope. One of skill in this art will immediately envisage the methods and variations used to implement this invention in other areas than those described in detail.

In the disclosure and the claims, terms such as "first", "second", "third", "fourth", and the like, if any, will be used to distinguish similar components from each other and be used to describe a specific sequence or a generation sequence, but is not necessarily limited thereto. It will be understood that these terms are compatible with each other under an appropriate environment so that exemplary embodiments of the present invention set forth herein may be operated in a sequence different from a sequence illustrated or described herein. Likewise, in the case in which it is described herein that a method includes a series of steps, a sequence of these steps suggested herein is not necessarily a sequence in which these steps may be executed. That is, any described step may be omitted and/or any other step that is not described herein may be added to the method.

Here, a phrase "in an exemplary embodiment" means the same exemplary embodiment, but is not necessarily limited thereto. In addition, in the disclosure and the claims, terms such as "connected", "connecting", "linked", "linking", "coupled", "coupling", and the like, and various modifications of these terms may be used as the meaning including that one component is directly connected to another component or is indirectly connected to another component through the other component.

In addition, terms "module" and "unit" for components used in the present disclosure are used only in order to easily make the disclosure. Therefore, these terms do not have meanings or roles that distinguish from each other in themselves.

In addition, terms used in the present disclosure are for explaining exemplary embodiments rather than limiting the present invention. In the present disclosure, a singular form includes a plural form unless explicitly described to the contrary. Components, steps, operations, and/or elements mentioned by terms "comprise" and/or "comprising" used in the disclosure do not exclude the existence or addition of one or more other components, steps, operations, and/or elements.

Hereinabove, the present invention has been described with reference to exemplary embodiments thereof. All exemplary embodiments and conditional illustrations disclosed in the present disclosure have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, exemplary embodiments disclosed herein should be considered in an illustrative aspect rather than a restrictive aspect. The scope of the present invention should be defined by the claims rather than the above-mentioned description, and equivalents to the claims should be interpreted to fall within the present invention.

While the foregoing is directed to embodiments of the present invention, other and further embodiments of the invention may be devised without departing from the basic scope thereof. For example, although numerous embodiments having various features have been described herein, combinations of such various features in other combinations not discussed herein are contemplated within the scope of embodiments of the present invention.

What is claimed is:

1. A method for database metadata transfer, the method comprising:
   receiving, by a computer, a command to transfer preproduction metadata from a preproduction database to a production metadata database containing production metadata;
   reading, by the computer, the preproduction metadata from the preproduction database;
   generating, by the computer, an extensible markup language (XML) data file containing the preproduction metadata;
   generating, by the computer, structured query language (SQL) commands in the XML data file;
   generating, by the computer, a list of preproduction metadata to be transferred using the XML data file; and
   transferring, by the computer, the list of preproduction metadata to the database containing production metadata in response to the SQL commands.

2. The method of claim 1, wherein the database is a call center database.

3. The method of claim 1, wherein the SQL commands are completed using micro language.

4. The method of claim 1, wherein the data file comprises a list of commands generated by the system that allow development of a list of data that needs to be transferred into a production database.

5. An apparatus comprising:
   memory; and
   a processor configured to:
      receive a command to transfer preproduction metadata from a from a preproduction database to a production metadata database containing production metadata;
      read the preproduction metadata from the preproduction database;
      generate an extensible markup language (XML) data file containing the preproduction metadata;
      generate structured query language (SQL) commands in the XML data file;
      generate a list of preproduction metadata to be transferred using the XML data file; and
      transfer the list of preproduction metadata to the database containing production metadata in response to the SQL commands.

6. The apparatus of claim 5, wherein the database is a call center database.

7. The apparatus of claim 5, wherein the SQL commands are completed using micro language.

8. The apparatus of claim 5, wherein the data file comprises a list of commands generated by the system that allow development of a list of data that needs to be transferred into a production database.

9. A non-transitory computer readable storage medium configured to store instructions that when executed by a processor causes the processor to:
   receive a command to transfer preproduction metadata from a from a preproduction database to a production metadata database containing production metadata;
   read the preproduction metadata from the preproduction database;

generate an extensible markup language (XML) data file containing the preproduction metadata;
generate structured query language (SQL) commands in the XML data file;
generate a list of preproduction metadata to be transferred using the XML data file; and
transfer the list of preproduction metadata to the database containing production metadata in response to the SQL commands.

10. The non-transitory computer readable storage medium of claim 9, wherein the database is a call center database.

11. The non-transitory computer readable storage medium of claim 9, wherein the SQL commands are completed using micro language.

12. The non-transitory computer readable storage medium of claim 9, wherein the data file comprises a list of commands generated by the system that allow development of a list of data that needs to be transferred into a production database.

* * * * *